United States Patent
Agapiou et al.

(10) Patent No.: US 10,487,256 B2
(45) Date of Patent: Nov. 26, 2019

(54) CEMENT COMPOSITIONS HAVING FAST SETTING TIMES AND HIGH COMPRESSIVE STRENGTHS

(71) Applicant: Halliburton Energy Services, Inc., Houston, TX (US)

(72) Inventors: Kyriacos Agapiou, Houston, TX (US); Thomas J. Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 208 days.

(21) Appl. No.: 15/526,953

(22) PCT Filed: Dec. 15, 2014

(86) PCT No.: PCT/US2014/070388
§ 371 (c)(1),
(2) Date: May 15, 2017

(87) PCT Pub. No.: WO2016/099444
PCT Pub. Date: Jun. 23, 2016

(65) Prior Publication Data
US 2019/0092999 A1 Mar. 28, 2019

(51) Int. Cl.
*E21B 33/13* (2006.01)
*C04B 28/06* (2006.01)
(Continued)

(52) U.S. Cl.
CPC ............... *C09K 8/467* (2013.01); *C04B 7/02* (2013.01); *C04B 28/06* (2013.01); *C04B 28/08* (2013.01);
(Continued)

(58) Field of Classification Search
CPC ..... C04B 2103/22; C04B 28/18; C04B 14/16; C04B 22/064; C04B 2103/408;
(Continued)

(56) References Cited

U.S. PATENT DOCUMENTS

| 3,645,336 A | 2/1972 | Young et al. |
| 7,226,895 B2 | 6/2007 | Xiang |

(Continued)

FOREIGN PATENT DOCUMENTS

| EP | 1900703 A1 | 3/2008 |
| WO | 2010106308 A1 | 9/2010 |
| WO | 2010124769 A1 | 11/2010 |

OTHER PUBLICATIONS

International Search Report and Written Opinion dated Aug. 19, 2015; International PCT Application No. PCT/US2014/070388.

*Primary Examiner* — Zakiya W Bates
(74) *Attorney, Agent, or Firm* — McGuireWoods LLP (57) ABSTRACT

A method of treating a subterranean formation comprising: introducing a first cement composition into the subterranean formation, wherein the first cement composition comprises: (A) a first aluminate cement; and (B) a base fluid; simultaneously introducing a second cement composition into the subterranean formation, wherein the second cement composition comprises: (A) a second cement consisting of cement or a pozzolan; and (B) a base fluid, wherein at least a portion of the first and second cement compositions mix together after introduction into the subterranean formation to form a mixed cement composition, and wherein at least some of the first and second cement compositions or at least some of the mixed cement composition enters into a highly-permeable area located within the subterranean formation; and allowing the mixed cement composition to set. The base fluid can be an aqueous liquid or a hydrocarbon liquid.

21 Claims, 3 Drawing Sheets

(51) Int. Cl.
  *C09K 8/467* (2006.01)
  *C09K 8/46* (2006.01)
  *C04B 7/02* (2006.01)
  *C04B 28/08* (2006.01)
  *C04B 103/00* (2006.01)

(52) U.S. Cl.
  CPC ........ *C09K 8/46* (2013.01); *C04B 2103/0028* (2013.01); *C04B 2103/0088* (2013.01); *Y02W 30/94* (2015.05)

(58) Field of Classification Search
  CPC ....... C04B 28/04; C04B 14/106; C04B 18/08; C04B 18/146; C04B 24/2647; C04B 24/383; C04B 40/065; C04B 7/32; C04B 28/06; C04B 2103/0008; C04B 2103/44; C04B 22/0013; C04B 22/142; C04B 24/003; C04B 24/04; C04B 24/06; C04B 24/18; C04B 24/22; C04B 2201/50; E21B 33/14
  See application file for complete search history.

(56) References Cited

U.S. PATENT DOCUMENTS

| | | |
|---|---|---|
| 2006/0131019 A1 | 6/2006 | Santra et al. |
| 2014/0011908 A1 | 1/2014 | Reddy et al. |

CEMENT COMPOSITIONS HAVING FAST SETTING TIMES AND HIGH COMPRESSIVE STRENGTHS

TECHNICAL FIELD

Cement compositions can be used in a variety of oil or gas operations. Cement compositions can be used to prevent lost circulation into a subterranean formation.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase. As used herein, a "base fluid" is the liquid that is in the greatest concentration of a fluid, generally more than about 50% by weight of any other fluid, and is the solvent of a solution or the external phase of a heterogeneous fluid. A water-based fluid is a fluid in which water is the base fluid, and an oil-based fluid is a fluid in which a hydrocarbon liquid is the base fluid.

A well can include, without limitation, an oil, gas, or water production well, an injection well, a geothermal well, or a high-temperature and high-pressure (HTHP) well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A cement composition can be used to combat fluid loss into a subterranean formation. As used herein, a "cement composition" is a mixture of at least cement and a base fluid that develops compressive strength or sets when in the presence of water. A cement composition is generally a slurry in which water is generally the external phase of the slurry and the cement (and any other insoluble particles) is the internal phase. The external phase of a cement composition can include dissolved solids. As used herein, the word "cement" means a binder, which is a dry substance that develops compressive strength and can set and can bind other materials together when mixed with water.

Cement compositions can be used to prevent severe fluid loss into the subterranean formation. By way of example, vugs and fissures can be located in a subterranean formation. The vugs and fissures are highly-permeable areas whereby a large quantity of the base fluid can undesirably flow into these highly-permeable areas. To help prevent or reduce the amount of fluid that is lost into the formation, a lost-circulation fluid can be used. A lost-circulation fluid can be a cement composition. The cement composition can flow into the highly-permeable areas. The cement composition can then set within the areas to more permanently fill the voids and reduce or eliminate fluid loss into the subterranean formation.

Thus, there is a need for improved cement compositions that can be used to prevent fluid loss in a subterranean formation.

It is desirable for a cement composition to have certain properties, such as a desired rheology, thickening time, and compressive strength.

If any laboratory test (e.g., compressive strength) requires the step of mixing, then the cement composition is mixed according to the following procedure. The base fluid is added to a mixing container and the container is then placed on a mixer base. The motor of the base is then turned on and maintained at 4,000 revolutions per minute "rpm" (+/−200 rpm). The cements and any other dry ingredients are added to the container at a uniform rate in not more than 15 seconds (s). After all the dry ingredients have been added to the base fluid in the container, a cover is then placed on the container, and the cement composition is mixed at 4,000 rpm (+/−200 rpm) for 1 min (+/−10 s). When the base fluid is a hydrocarbon liquid, then a specified weight of the oil-based cement composition is then mixed by hand for at least 1 min with a specified weight of water.

It is also to be understood that if any laboratory test requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). The purpose of the specific rate of temperature ramping during measurement is to simulate the temperature profile experienced by the cement composition as it is being pumped downhole. After the cement composition is ramped up to the specified temperature and possibly specified pressure, the cement composition is maintained at that temperature and pressure for the duration of the testing.

It is necessary for a cement composition to remain pumpable during introduction into the well and until the cement composition is situated in the portion of the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the composition to set.

As used herein, the "thickening time" is how long it takes for a cement composition to become unpumpable at a specified temperature and pressure. The pumpability of a cement composition is related to the consistency of the cement composition. The consistency of a cement composition is measured in Bearden units of consistency (Bc), a dimensionless unit with no direct conversion factor to the more common units of viscosity. As used herein, a cement composition becomes "unpumpable" when the consistency of the substance reaches 70 Bc. As used herein, the consistency of a cement composition is measured as follows. The cement composition is mixed. The cement composition is then placed in the test cell of a High-Temperature, High-Pressure (HTHP) consistometer, such as a FANN® Model 275 or a Chandler Model 8240, at a specified temperature and pressure. Consistency measurements are taken continuously until the cement composition exceeds 70 Bc.

A cement composition can develop compressive strength. Cement composition compressive strengths can vary from 50 psi to over 10,000 psi (0 to over 69 MPa). Compressive strength is generally measured at a specified time after the cement composition has been mixed and at a specified temperature and pressure. Compressive strength can be measured, for example, at a time of 24 hours. According to ANSI/API 10B-2, Recommended Practice for Testing Well Cements, the "compressive strength" of a cement composition can be measured by either a destructive method or non-destructive method.

The destructive method of a cement composition is measured as follows. The cement composition is mixed and allowed to cure at a specified temperature for a specified period of time. The cured sample is then placed into a compression-testing device, such as a Super L Universal testing machine model 602, available from Tinius Olsen, Horsham in Pennsylvania, USA. According to the destructive method, the compressive strength is calculated as the force required to break the sample divided by the smallest cross-sectional area in contact with the load-bearing plates of the compression-testing device. The compressive strength is reported in units of pressure, such as pound-force per square inch (psi) or megapascals (MPa).

The non-destructive method continually measures correlated compressive strength of a cement composition sample throughout the test period by utilizing a non-destructive sonic device such as an Ultrasonic Cement Analyzer (UCA) available from FANN® Instruments in Houston, Tex., USA. The non-destructive method of a cement composition is measured at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) at a specified temperature and pressure. As used herein, the "initial setting time" is the difference in time between when the cements come in contact with water and when the cement composition is initially set.

As used herein, the term "set," and all grammatical variations thereof, are intended to mean the process of becoming hard or solid by curing. As used herein, the "setting time" is the difference in time between when the cements come in contact with water and when the cement composition has set at a specified temperature. It can take up to 48 hours or longer for a cement composition to set.

According to certain embodiments, a method of treating a subterranean formation comprises: introducing a first cement composition into the subterranean formation, wherein the first cement composition comprises: (A) a first aluminate cement; and (B) a base fluid; simultaneously introducing a second cement composition into the subterranean formation, wherein the second cement composition comprises: (A) a second cement consisting of cement or a pozzolan; and (B) a base fluid, wherein at least a portion of the first and second cement compositions mix together after introduction into the subterranean formation to form a mixed cement composition, and wherein at least some of the first and second cement compositions or at least some of the mixed cement composition enters into a highly-permeable area located within the subterranean formation; and allowing the mixed cement composition to set.

According to certain other embodiments, an oil-based cement composition is provided. According to these embodiments, a method of treating a subterranean formation with an oil-based cement composition comprises: introducing the oil-based cement composition into the subterranean formation, wherein the oil-based cement composition comprises: (A) a base fluid, wherein the base fluid comprises a hydrocarbon liquid; (B) a first aluminate cement; and (C) a second cement consisting of cement or a pozzolan, wherein at least a portion of the oil-based cement composition mixes with an aqueous liquid after introduction into the subterranean formation to form a mixed cement composition, and wherein at least some of the oil-based cement composition and the aqueous liquid or at least some of the mixed cement composition enters into a highly-permeable area located within the subterranean formation; and allowing the mixed cement composition to set.

It is to be understood that the discussion of preferred embodiments regarding the cement compositions or any ingredients in the cement compositions, is intended to apply to all of the method embodiments. Any reference to the unit "gallons" means U.S. gallons.

The first cement composition and the second cement composition include a base fluid. The base fluid can be the external phase of the cement composition. The base fluid for the first and second cement compositions can be the same or different. By way of example, both of the base fluids can include an aqueous liquid. By way of another example, the base fluid for the first cement composition can include an aqueous liquid while the base fluid for the second cement composition can include a hydrocarbon liquid. The base fluid can be in a concentration of at least 15% by weight of the first or second cement. The base fluid can also be in a concentration in the range of about 15% to about 75%, alternatively about 25% to about 60%, by weight of the first or second cement.

The aqueous liquid for the base fluid includes water. The water can be selected from the group consisting of freshwater, brackish water, seawater, and saltwater, in any combination thereof in any proportion. The aqueous liquid can also include a water-soluble salt. The salt can be selected from the group consisting of sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The oil-based cement composition includes a base fluid of a hydrocarbon liquid. The hydrocarbon liquid for any of the base fluids can be selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. Preferably, the saturated hydrocarbon is a paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. Preferably, the unsaturated hydrocarbon is an alkene. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include, ENCORE® drilling fluid and ACCOLADE® drilling fluid, marketed by Halliburton Energy Services, Inc.

The first cement composition and the oil-based cement composition include a first aluminate cement. The aluminate cement can be a calcium-aluminate cement (CAC). The aluminate cement can also be a high aluminate cement, which is a cement having about 60% or more aluminate content. A commercially-available example of a suitable CAC is SECAR® 71, available from Kerneos, Inc. in Chesapeake, Va., USA.

The second cement composition and the oil-based cement composition include a second cement. The second cement consists of a cement or a pozzolan. According to certain embodiments, the cement is not an aluminate cement, such as CAC. The cement can be Class A cement, Class C cement, Class G cement, Class H cement, and any combination thereof. The cement can be, without limitation, Portland cement, Gypsum cement, Joppa cement, Dyckerhoff cement, slag cement, or combinations thereof. A commercially-available example of a suitable second cement is Class H Portland cement available from Texas Lehigh Cement Company, LP in Buda, Tex., USA.

The second cement can also be a pozzolan. As used herein, a "pozzolan" is a siliceous or siliceous and aluminous material which, in itself, possesses little or no cementitious value but which will, in finely divided form and in the presence of water, chemically react with a source of calcium at a temperature of 71° F. (22° C.) to form compounds possessing cementitious properties. As used herein, the phrase "cementitious properties" means the ability to bind materials together and set. It is to be understood that the term "pozzolan" does not necessarily indicate the exact chemical make-up of the material, but rather refers to its capability of reacting with a source of calcium and water to form compounds possessing cementitious properties. When a pozzolan is mixed with water, the silicate phases of the pozzolan can undergo a hydration reaction and form hydration products of calcium silicate hydrate (often abbreviated as C—S—H) and also possibly calcium aluminate hydrate.

The degree to which a material functions as a pozzolan can be determined by the material's pozzolanic activity. The pozzolanic activity of a pozzolan is the reaction rate between the pozzolan and a source of calcium (e.g., $Ca^{2+}$, calcium oxides "CaO", or calcium hydroxides "$Ca(OH)_2$") in the presence of water. The pozzolanic activity can be measured by determining the amount of calcium the pozzolan consumes over time or by determining the compressive strength of a cement composition containing the pozzolan as the cement.

The pozzolanic activity is dependent on some of the characteristics of the pozzolan, such as the chemical composition of the pozzolan, and the particle size, which also determines the specific surface area, of the pozzolan particles. As used herein, the term "particle size" refers to the volume surface mean diameter ("$D_s$"), which is related to the specific surface area of the particle. The volume surface mean diameter may be defined by the following equation: $D_s=6/(\Phi_s A_w \rho_p)$, where $\Phi_s$=sphericity; $A_w$=specific surface area; and $\rho_p$=particle density. According to certain embodiments, the chemical composition and the particle size of the pozzolan as the second cement are selected such that the second cement composition has a setting time less than 24 hours at a temperature of 71° F. (22° C.) and a pressure of 1 atmosphere. When the second cement is a pozzolan, then the cement composition can further include a source of calcium, for example calcium oxide or calcium hydroxide.

Any of the cement compositions can have a density of at least 4 pounds per gallon (ppg) (0.48 kilograms per liter "kg/L"). The cement compositions can have a density in the range of about 4 to about 20 ppg (about 0.48 to about 2.4 kg/L), alternatively about 8 to about 17 ppg (about 0.95 to about 2.0 kg/L).

Any of the cement compositions can further include one or more additives. The one or more additives can be selected from the group consisting of a phosphate source, viscosifier or suspending agent, a filler, a lost-circulation material, a fluid loss additive, a strength enhancer, a friction reducer, a light-weight additive, a defoaming agent, a high-density additive, a mechanical property enhancing additive, a filtration-control additive, a thixotropic additive, a set retarder, and combinations thereof.

The cement composition can include a phosphate source. Incorporation of a phosphate source, such as polyphosphate, can change the composition of the set material, for example, from calcium aluminosilicate to calcium alumino (phosphate-silicate). The phosphate source can be a set accelerator in which the setting time of the cement composition is decreased such that the composition sets very rapidly.

The cement composition can include a viscosifier or suspending agent. Suitable examples of commercially-available viscosifiers or suspending agents include, but are not limited to, SA-1015™, THERMA-VIS™, and BARA-ZAN®, marketed by Halliburton Energy Services, Inc. The viscosifier or suspending agent can be in a concentration in the range of about 0.01% to about 10% by weight of the cements "bwoc."

The cement composition can include a filler. Suitable examples of fillers include, but are not limited to, fly ash, sand, clays, and vitrified shale. The filler can be in a concentration in the range of about 1% to about 50% bwoc.

The cement composition can include a lost-circulation material. Suitable examples of commercially-available lost-circulation materials include, but are not limited to, BARACARB® sized ground marble, marketed by Halliburton Energy Services, Inc. The lost-circulation material can be in a concentration in the range of about 1% to about 50% bwoc.

The cement composition can include a fluid loss additive. Suitable examples of commercially-available fluid loss additives include, but are not limited to, HALAD®-344, and HALAD®-413, marketed by Halliburton Energy Services, Inc. The fluid loss additive can be in a concentration in the range of about 0.1% to about 20% bwoc.

The cement composition can include a friction reducer. Suitable examples of commercially-available friction reducers include, but are not limited to, CFR-2™, CFR-3™, CFR-5LE™, CFR-6™, and CFR-8™, marketed by Halliburton Energy Services, Inc. The friction reducer can be in a concentration in the range of about 0.1% to about 10% bwoc.

The cement composition can include a set retarder. Suitable examples of commercially-available set retarders include, but are not limited to, and are marketed by Halliburton Energy Services, Inc. under the trade names HR®-4, HR®-5, HR®-6, HR®-12, HR®-20, HR®-25, SCR-100™, and SCR-500™. The set retarder can also be selected from citric acid and glucono-d-lactone. The set retarder can be in a concentration in the range of about 0.05% to about 10% bwoc.

The cement composition can include a strength-retrogression additive. Suitable examples of commercially-available strength-retrogression additives include, but are not limited to, and are marketed by Halliburton Energy Services, Inc. under the trade names SSA-1™ and SSA-2™. The strength-retrogression additive can be in a concentration in the range of about 5% to about 50% bwoc.

The cement composition can include a light-weight additive. Suitable examples of commercially-available light-weight additives include, but are not limited to, and are marketed by Halliburton Energy Services, Inc. under the trade names SPHERELITE® and LUBRA-BEADS® FINE; and available from 3M in St. Paul, Minn. under the trade names HGS2000™, HGS3000™, HGS4000™, HGS5000™, HGS6000™, HGS10000™, and HGS18000™ glass bubbles. The light-weight additive can be in a concentration in the range of about 5% to about 50% bwoc.

Commercially-available examples of other additives include, but are not limited to, and are marketed by Halliburton Energy Services, Inc. under the trade names: HIGH DENSE® No. 3, HIGH DENSE® No. 4, BARITE™, and MICROMAX™, heavy-weight additives; SILICALITE™, extender and compressive-strength enhancer; WELLLIFE® 665, WELLLIFE® 809, and WELLLIFE® 810 mechanical property enhancers.

Figure 1:
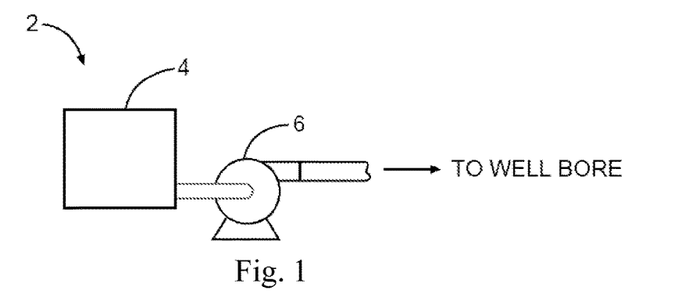
FIG. 1 illustrates a system for preparation and delivery of a cement composition to a wellbore according to certain embodiments.

FIG. 1 illustrates a system that can be used in the preparation of the cement compositions and delivery to a wellbore according to certain embodiments. As shown, the cement compositions can be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 can be located on one or more cement trucks. In some embodiments, a jet mixer can be used, for example, to continuously mix the cement compositions, including water, as they are being pumped to the wellbore. The first and second cement compositions can be mixed separately using the mixing equipment. In this manner, the first and second cement compositions do not mix together until after introduction into the subterranean formation. For the oil-based cement composition, the cement composition can be mixed without any water and then introduced into the subterranean formation. In this manner, the oil-based cement composition does not mix with the aqueous liquid until after introduction into the subterranean formation.

Figure 2A:
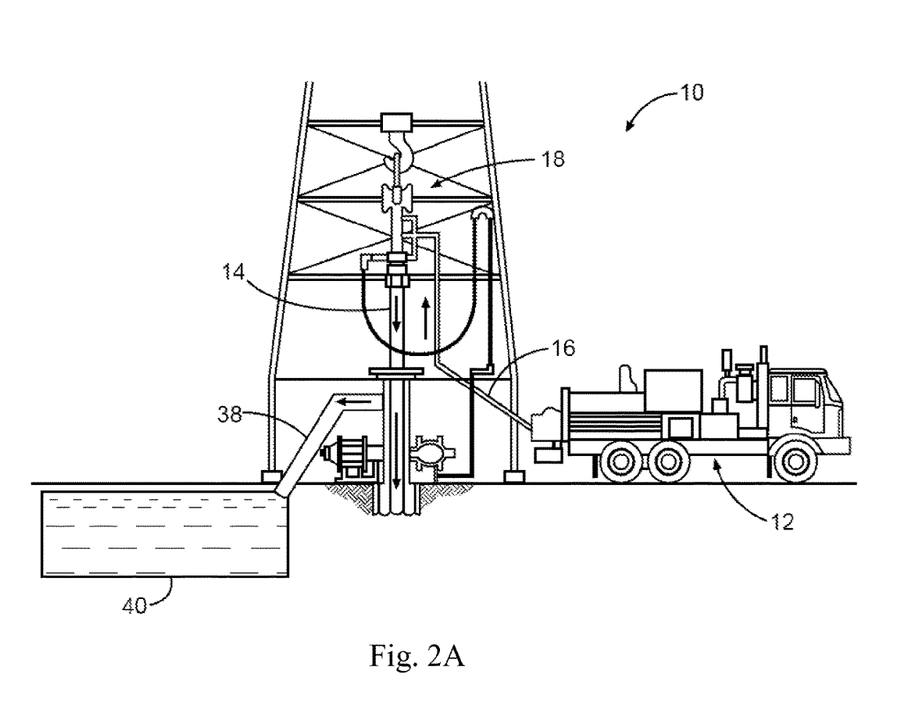
FIG. 2A illustrates surface equipment that may be used in placement of a cement composition into a wellbore.

An example technique and system for introducing the cement compositions into a subterranean formation will now be described with reference to FIGS. 2A and 2B. FIG. 2A illustrates surface equipment 10 that can be used to introduce the cement compositions. It should be noted that while FIG. 2A generally depicts a land-based operation, those skilled in the art will readily recognize that the principles described herein are equally applicable to subsea operations that employ floating or sea-based platforms and rigs. The surface equipment 10 can include a cementing unit 12, which can include one or more cement trucks, mixing equipment 4, and pumping equipment 6 (e.g., as depicted in FIG. 1). The cementing unit 12 can pump the cement compositions 14 through a feed pipe 16 and to a cementing head 18, which conveys the cement composition 14 downhole.

The method embodiments include the step of introducing the first cement composition into the subterranean formation 20 and simultaneously introducing the second cement composition into the subterranean formation. According to certain other embodiments, the methods include introducing the oil-based cement composition into the subterranean formation. Turning now to FIG. 2B, the steps of introducing can include pumping the cement compositions into the subterranean formation using one or more pumps 6. The steps of introducing can be for the purpose of inhibiting or preventing lost circulation into the subterranean formation. The cement compositions can be in a pumpable state before and during introduction into the subterranean formation 20. According to certain embodiments, the subterranean formation 20 is penetrated by a well 22. The well can be, without limitation, an oil, gas, or water production well, an injection well, a geothermal well, or a high-temperature and high-pressure (HTHP) well. According to this embodiment, the steps of introducing include introducing the cement compositions into the well 22. The wellbore 22 comprises walls 24. A surface casing 26 can be inserted into the wellbore 22. The surface casing 26 can be cemented to the walls 24 via a cement sheath 28. One or more additional conduits (e.g., intermediate casing, production casing, liners, etc.) shown here as casing 30 can also be disposed in the wellbore 22. One or more centralizers 34 can be attached to the casing 30, for example, to centralize the casing 30 in the wellbore 22 prior to and during the cementing operation. According to other embodiments, the subterranean formation 20 is penetrated by a wellbore 22 and the well includes an annulus 32 formed between the casing 30 and the walls 24 of the wellbore 22 and/or the surface casing 26.

Figure 2B:
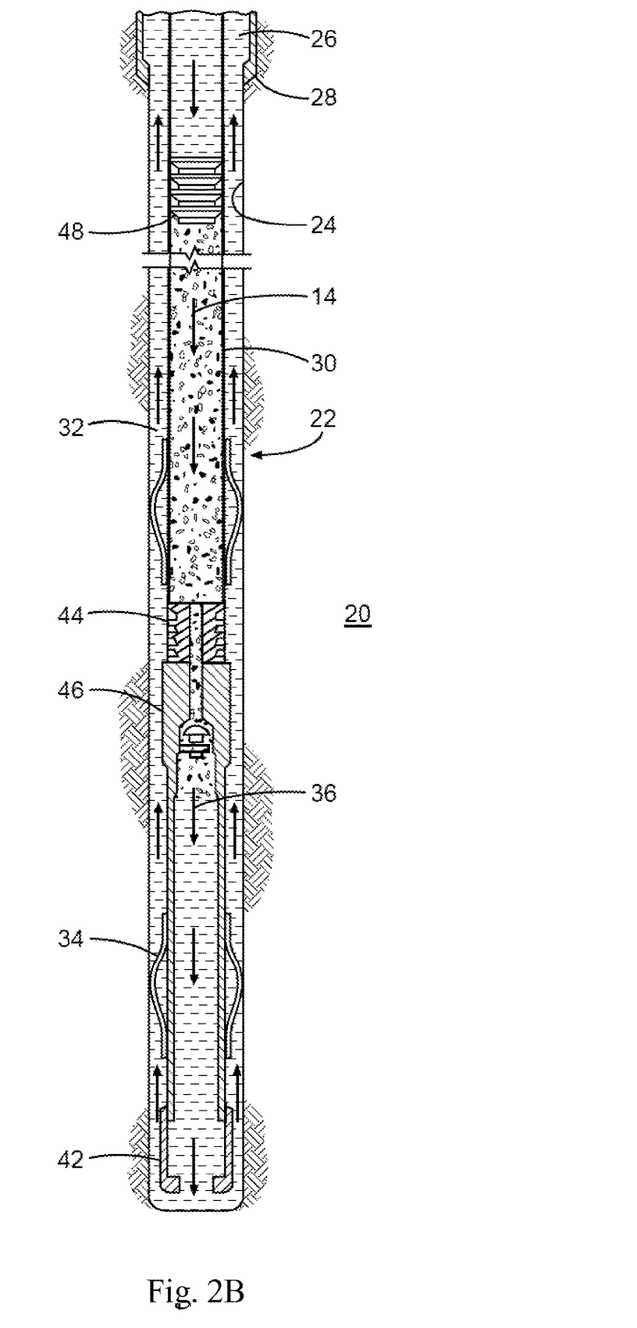
FIG. 2B illustrates placement of a cement composition into an annulus of a wellbore.

With continued reference to FIG. 2B and pertaining to the oil-based cement composition, the oil-based cement composition 14 can be pumped down the interior of the casing 30. The oil-based cement composition 14 can be allowed to flow down the interior of the casing 30 through the casing shoe 42 at the bottom of the casing 30 and up around the casing 30 into the annulus 32. While not illustrated, other techniques can also be utilized for introduction of the oil-based cement composition 14. By way of example, reverse circulation techniques can be used that include introducing the oil-based cement composition 14 into the subterranean formation 20 by way of the annulus 32 instead of through the casing 30. The aqueous liquid for mixing with the oil-based cement composition can already be located within the subterranean formation or it can be pumped into the formation via the casing or annulus, for example, to mix with the oil-based cement composition.

With reference to the first and second cement compositions, the first and second cement compositions can be introduced into the subterranean formation via different conduits whereby the cement compositions do not come in contact with one another during introduction. By way of example, the first cement composition can be introduced into the casing 30 while the second cement composition can simultaneously be introduced into the annulus 32 or vice versa.

After introduction into the subterranean formation, at least a portion of the first and second cement compositions mix together to form a mixed cement composition. After introduction into the subterranean formation, at least some of the oil-based cement composition mixes with an aqueous liquid to form a mixed cement composition. When both the first and second cements and an aqueous liquid are mixed together, the mixed cement composition very quickly develops a high gel strength, has a low thickening time and setting time, and quickly transitions to a set cement composition. By way of example, the mixed cement composition can have a thickening time of less than 1 minute, an initial setting time of less than 1 minute, and a setting time of about 20 minutes. These properties are a result of the synergistic effect of the first and second cements. In other words, the properties (e.g., thickening time, setting time, and compressive strength) are different than a cement composition containing just the first cement or the second cement.

Due to these extremely fast thickening and setting times, the first cement, the second cement, and the aqueous liquid should be physically separated until the cement compositions are situated in the desired location downhole wherein the 3 components can then mix together to form the mixed cement composition. When the base fluid is a hydrocarbon liquid, then the first cement and the second cement can both be included in the base fluid because the aqueous liquid is not present. However, when the base fluid is the aqueous liquid, then the first and second cements should be separated into two different cement compositions and introduced separately into the subterranean formation.

The steps of introducing can also include introducing the cement compositions into one or more highly-permeable areas within the subterranean formation, such as vugs or fissures. The portion of the first cement composition and second cement composition or the portion of the oil-based cement composition and the aqueous liquid can mix together prior to, during, or after flowing into the one or more highly-permeable areas. Accordingly, the mixed cement composition can be formed prior to flowing into the highly-permeable areas or the mixed cement composition can be formed after flowing into the highly-permeable areas. However, the formation of the mixed cement composition should not occur too soon before the mixed cement composition reaches the highly-permeable areas such that the mixed cement composition thickens or sets too quickly to be able to flow into the highly-permeable areas. The mixed cement composition can thicken or develop a high gel strength within the highly-permeable areas. The mixed cement composition can then more effectively remain in the highly-permeable areas without other fluids being able to displace or remove the mixed cement composition from the areas. Moreover, the mixed cement composition can also set within the highly-permeable areas. In this manner, the mixed cement composition should be able to flow into the highly-permeable areas, remain in the areas, and set within the areas to inhibit or prevent fluid loss into the subterranean formation. Accordingly, the first, second, and oil-based cement compositions should all have thickening times and setting times sufficiently long to allow them to be pumped downhole and allowed to mix before thickening too much or prematurely setting.

The mixed cement composition can have a ratio of the first cement to second cement in the range of about 100:1 to about 1:100.

As they are introduced, the cement compositions 14 can displace other fluids 36, such as drilling fluids and/or spacer fluids that may be present in the interior of the casing 30 and/or the annulus 32. At least a portion of the displaced fluids 36 can exit the annulus 32 via a flow line 38 and be deposited, for example, in one or more retention pits 40 (e.g., a mud pit), as shown on FIG. 2A. Referring again to FIG. 2B, a bottom plug 44 can be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 can be introduced into the wellbore 22 behind the cement composition 14. The top plug 48 can separate the cement composition 14 from a displacement fluid and also push the cement composition 14 through the bottom plug 44.

The mixed cement composition can have a thickening time of less than about 30 minutes, alternatively less than about 15 minutes, at a temperature of 80° F. (27° C.). The cement composition can have a thickening time less than about 30 minutes, alternatively less than about 15 minutes, at the bottomhole temperature and pressure of the subterranean formation.

The mixed cement composition can have a compressive strength greater than 200 psi (1.4 MPa) at a time of 30 minutes, a temperature of 71° F. (22° C.), and a pressure of 1 atm (0.1 MPa). The mixed cement composition can also have a compressive strength greater than 2,000 psi (14 MPa) at a time of 24 hours, a temperature of 71° F. (22° C.), and a pressure of 1 atm (0.1 MPa). The mixed cement composition can also have a compressive strength greater than 4,000 psi (28 MPa) at a time of 24 hours, a temperature of 100° F. (38° C.) or higher, and a pressure of 1 atm (0.1 MPa). As discussed above, the compressive strength of the mixed cement composition can be greater than the compressive strength of a cement composition containing only the first or second cement. The synergistic effect of both cements working in tandem can provide much higher compressive strengths to the mixed cement composition than either cement could alone.

The mixed cement composition can have an initial setting time less than 2 hours, alternatively less than 1 hour, at a temperature of 71° F. (22° C.) and a pressure of 1 atm (0.1 MPa). The mixed cement composition can have a setting time less than 24 hours, alternatively less than 12 hours, at a temperature of 71° F. (22° C.) and a pressure of 1 atm (0.1 MPa). As discussed above, the setting time of the mixed cement composition can be less than the setting time of a cement composition containing only the first or second cement. The synergistic effect of both cements working in tandem can provide much lower setting times to the mixed cement composition than either cement could alone.

The method embodiments also include the step of allowing the mixed cement composition to set. The step of allowing can occur after the mixed cement composition is formed. The step of allowing can also occur after the mixed cement composition is situated in one or more highly-permeable areas within the subterranean formation. The set mixed cement composition can inhibit or prevent fluid loss into the subterranean formation.

EXAMPLES

To facilitate a better understanding of the present invention, the following examples of certain aspects of preferred embodiments are given. The following examples are not the only examples that could be given according to the present invention and are not intended to limit the scope of the invention.

For the Tables and Figures, cement compositions were prepared and tested according to the specifics for each test according to the Detailed Description section above.

Figure 3:
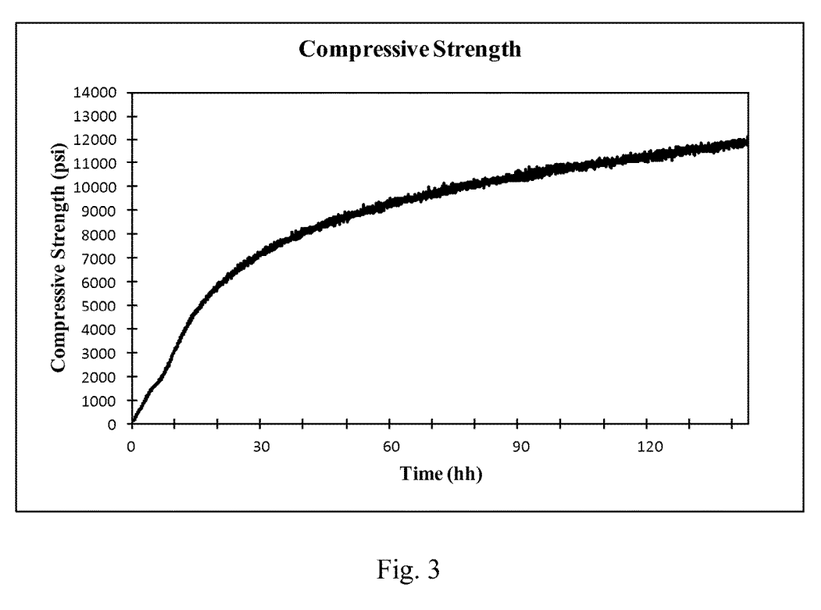
FIG. 3 is a graph of compressive strength (psi) versus time (hours) for a cement composition according to certain embodiments.

Table 1 lists the ingredients for a water-based cement composition containing a calcium aluminate cement of SECAR® 71, SHMP is a polyphosphate as a phosphate source, citric acid and glucono-d-lactone were used as set retarders. The discussion and results for Tables 1-4 and FIG. 3 show the system when the base fluid is an aqueous liquid.

TABLE 1

| Ingredient | Conc. (g) | Conc. (% weight) |
| --- | --- | --- |
| Water | 311 | 27.7 |
| SECAR ® 71 | 760 | 67.7 |
| SHMP | 40 | 3.6 |
| Citric Acid | 8 | 0.7 |
| Glucono-d-lactone | 4 | 0.4 |
| Total | 1,123 | 100.0 |

Table 2 lists the rheology for the CAC composition from Table 1. As can be seen, the rheology indicates that the CAC composition had a relatively low viscosity.

TABLE 2

| RPM | | | | | |
| --- | --- | --- | --- | --- | --- |
| 3 | 6 | 100 | 200 | 300 | 600 |
| 1 | 1 | 5 | 10 | 19 | 47 |

Table 3 lists the cement composition number, time, temperature, and compressive strength for two different cement compositions. Compressive strength was performed using the destructive method and the curing temperatures are provided in the Table. Cement composition #1 included 250 grams (g) of the CAC composition from Table 1 to which 7.5 g of Class H Portland cement (dry cement) was added and then mixed by hand with a spatula for approximately 1 min. Cement composition #2 included 300 g of the CAC composition from Table 1 to which 18 g of a 50%/50% by weight freshwater and Class H Portland cement (wet blend composition) was added and stirred by hand with a spatula for approximately 1 min. Cement composition #2 simulated actual wellbore conditions in which the 2 different cement compositions would be pumped separately downhole and then mixed together within the subterranean formation. Both cement compositions became very viscous during the stirring with the spatula.

TABLE 3

| Composition # | Time (min/hr) | Temperature (° F.) | Compressive Strength (psi) |
| --- | --- | --- | --- |
| 1 | 20 min | 71 | 183 |
| 2 | 20 min | 71 | 218 |
| 2 | 24 hr | 60 | 2,857 |
| 2 | 24 hr | 71 | 2,653 |
| 2 | 24 hr | 100 | 4,508 |
| 2 | 24 hr | 140 | 7,952 |

As can be seen in Table 3, both compositions exhibited good compressive strength even after only 20 minutes. This indicates that the addition of the Portland cement decreased the thickening time, initial setting time, and setting time to very low values. The application of heat provided much improved compressive strength development for values of almost 8,000 psi (55 MPa). Even at low temperatures of 60° F. (16° C.), the cement composition set and developed a compressive strength of almost 3,000 psi (21 MPa). The low temperature setting performance and the overall setting performance and excellent compressive strengths occurred as a result of the aggressive reactivity of the CAC and Portland cement, which first resulted in a very fast gelation phenomenon upon initial mixing of the cements with water, followed by a strong exothermic reaction which generated a great quantity of heat. This indicates that when the first aluminate cement, the second cement, and the aqueous liquid come in contact with each other and mix, then the mixed cement composition will quickly become very viscous, allowing the composition to remain within a highly-permeable area and quickly set within the highly-permeable area to provide fluid loss control.

Table 4 and FIG. 3 show the initial setting time, setting time, and several compressive strengths for cement composition #2 from Table 3. Compressive strength was performed using the non-destructive method at a temperature of 80° F. (27° C.) and a pressure of 3,000 psi (21 MPa). The destructive compressive strength is also listed in Table 4.

TABLE 4

| Initial Setting Time | Setting Time | Compressive Strengths | | | | | |
|---|---|---|---|---|---|---|---|
| | | 12 hr | 24 hr | 48 hr | Final | Maximum | Destructive |
| <30 s | 1:35 | 3,802 | 6,378 | 8,622 | 11,887 | 12,085 | 9,232 |

As can be seen in Table 4 and FIG. 3, cement composition #2 exhibited very high non-destructive compressive strengths and very short initial setting and setting times. This corroborates the results from Table 3 using the destructive method.

Table 5 lists the ingredients for two different oil-based cement compositions containing diesel oil as the hydrocarbon liquid base fluid, a calcium aluminate cement of SECAR® 71, SHMP is a polyphosphate as a phosphate source, citric acid and glucono-d-lactone were used as set retarders. Cement composition #4 had a lower amount of diesel as the base fluid compared to cement composition #3. The discussion and results for Tables 5-7 show the system when the base fluid is a hydrocarbon liquid.

TABLE 5

| | Composition #3 | | Composition #4 | |
|---|---|---|---|---|
| Ingredient | Conc. (g) | Conc. (% weight) | Conc. (g) | Conc. (% weight) |
| Diesel oil | 868 | 50.6 | 434 | 33.9 |
| SECAR ® 71 | 760 | 44.3 | 760 | 59.4 |
| Class H Portland Cement | 34 | 2.0 | 34 | 2.7 |
| SHMP | 40 | 2.3 | 40 | 3.1 |
| Citric Acid | 8 | 0.5 | 8 | 0.1 |
| Glucono-d-lactone | 4 | 0.2 | 4 | 0.3 |
| Total | 1,714 | 100.0 | 1,280 | 100.0 |

Table 6 lists the time and compressive strength for the cement compositions #3 and #4 from Table 5 after being mixed with freshwater to form a mixed cement composition along with a control cement composition of THERMATEK® RSP magnesium-based and oil-based settable composition. Compressive strength was performed using the destructive method at a curing temperature of 71° F. (22° C.) and a pressure of 1 atm. 200 g of the control cement composition was mixed with 25 g of tap water; 200 g of cement composition #3 was mixed with 25 g of tap water; and 170 g of cement composition #4 was mixed with 21 g of tap water—all yielding the water at a concentration of 12.5% by weight of the cement composition. All 3 mixed compositions were mixed by hand with a spatula for approximately 1 min. Mixed cement compositions #3 and #4 became very viscous during the stirring with the spatula.

TABLE 6

| Composition # | Time | Compressive Strength (psi) |
|---|---|---|
| Control | 24 hr | <50 |
| 3 | 14 day | 2,052 |
| 3 | 24 hr | 3,500 |
| 4 | 30 min | 252 |
| 4 | 24 hr | 3,435 |

As can be seen in Table 6, the control cement composition did set, but exhibited very poor compressive strength after 24 hours; whereas compositions #3 and #4 exhibited an increase in compressive strength of over 3,000 psi compared to the control. This indicates that the combination of the CAC and Portland cement decreased the thickening time, initial setting time, and setting time to very low values. Moreover, the variation in the amount of base fluid hydrocarbon liquid did not have an appreciable effect on the 24 hour compressive strength of the mixed cement composition. This indicates that a desired density and concentration of ingredients and base fluid can be used depending on the specifics for the particular oil and gas operation. Additionally, when the first aluminate cement, the second cement, and the aqueous liquid come in contact with each other and mix, then the mixed cement composition will quickly become very viscous, allowing the composition to remain within a highly-permeable area and quickly set within the highly-permeable area to provide fluid loss control.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising:
   introducing a first cement composition into the subterranean formation, wherein the first cement composition comprises:
   (A) a first aluminate cement; and
   (B) a base fluid;
   Simultaneously introducing a second cement composition into the subterranean formation, wherein the first cement composition and the second cement composition are separate from one another during introduction: wherein the second cement composition comprises:
   (A) a second cement comprising a cement selected from the group consisting of Class A cement, Class C cement, Class G cement, Class H cement, Portland cement, Gypsum cement, Joppa cement, Dyckerhoff cement, slag cement, and any combination thereof, and
   (B) a base fluid,
   wherein at least a portion of the first and second cement compositions mix together after introduction into the subterranean formation to form a mixed cement composition, and
   wherein at least some of the first and second cement compositions or at least some of the mixed cement composition enters into a highly-permeable area located within the subterranean formation; and
   allowing the mixed cement composition to set.

2. The method according to claim 1, wherein the base fluid for the first cement composition and the second cement composition is selected from an aqueous liquid or a hydrocarbon liquid.

3. The method according to claim 2, wherein the aqueous liquid comprises water, and wherein the water is selected from the group consisting of freshwater, brackish water, seawater, and saltwater, in any combination thereof in any proportion.

4. The method according to claim 2, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

5. The method according to claim 1, wherein the aluminate cement is a calcium-aluminate cement.

6. The method according to claim 1, wherein the first and second cement compositions are mixed separately using mixing equipment prior to introduction into the subterranean formation.

7. The method according to claim 1, wherein the first and second cement compositions are introduced into the subterranean formation via different conduits whereby the cement compositions do not come in contact with one another during introduction.

8. The method according to claim 7, wherein the first cement composition is introduced into a casing of a wellbore penetrating the subterranean formation while the second cement composition is simultaneously introduced into an annulus formed between the outside of the casing and a wall of the wellbore or the first cement composition is introduced into the annulus while the second cement composition is introduced into the casing.

9. The method according to claim 1, wherein the first and second cement compositions or the mixed cement composition is introduced into one or more highly-permeable areas within the subterranean formation.

10. The method according to claim 9, wherein the portion of the first cement composition and second cement composition mix together prior to, during, or after flowing into the one or more highly-permeable areas.

11. The method according to claim 9, wherein the mixed cement composition sets within the highly-permeable areas.

12. The method according to claim 1, wherein the mixed cement composition has a thickening time of less than 30 minutes at a temperature of 80° F.

13. The method according to claim 1, wherein the mixed cement composition has a compressive strength greater than 2,000 psi at a time of 24 hours, a temperature of 71° F., and a pressure of 1 atmosphere.

14. The method according to claim 1, wherein the steps of introducing comprise using one or more pumps to pump the cement compositions into the subterranean formation.

15. A method of treating a subterranean formation with an oil-based cement composition comprising:
   introducing the oil-based cement composition into the subterranean formation, wherein the oil-based cement composition comprises:
   (A) a base fluid, wherein the base fluid comprises a hydrocarbon liquid;
   (B) a first aluminate cement; and
   (C) a second cement comprising a cement selected from the group consisting of Class A cement, Class C cement, Class G cement, Class H cement, Portland cement, Gypsum cement, Joppa cement, Dyckerhoff cement, slag cement, and any combinations thereof,
   wherein at least a portion of the oil-based cement composition mixes with an aqueous liquid after introduction into the subterranean formation to form a mixed cement composition, wherein the oil-based cement composition is separate from the aqueous liquid during the introducing; and
   wherein at least some of the oil-based cement composition and the aqueous liquid or at least some of the mixed cement composition enters into a highly-permeable area located within the subterranean formation; and allowing the mixed cement composition to set.

16. The method according to claim 15, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

17. The method according to claim 15, further comprising mixing the oil-based cement composition using mixing equipment, wherein the oil-based cement composition is mixed without any water.

18. The method according to claim 15, wherein the aqueous liquid for mixing with the oil-based cement composition is already be located within the subterranean formation or is pumped into the subterranean formation.

19. The method according to claim 15, wherein the oil-based cement composition and the aqueous liquid or the mixed cement composition is introduced into one or more highly-permeable areas within the subterranean formation.

20. The method according to claim 19, wherein the mixed cement composition sets within the highly-permeable areas.

21. The method according to claim 15, wherein the mixed cement composition has a compressive strength greater than 2,000 psi at a time of 24 hours, a temperature of 71° F., and a pressure of 1 atmosphere.

* * * * *